(12) United States Patent
Motoyama et al.

(10) Patent No.: US 11,331,850 B2
(45) Date of Patent: May 17, 2022

(54) METHOD FOR MANUFACTURING SHAPED ARTICLE, AND SHAPED ARTICLE

(71) Applicant: SUMITOMO ELECTRIC SINTERED ALLOY, LTD., Takahashi (JP)

(72) Inventors: Hiroaki Motoyama, Takahashi (JP); Takanori Ootaki, Takahashi (JP)

(73) Assignee: SUMITOMO ELECTRIC SINTERED ALLOY, LTD., Takahashi (JP)

( * ) Notice: Subject to any disclaimer, the term of this patent is extended or adjusted under 35 U.S.C. 154(b) by 303 days.

(21) Appl. No.: 16/348,664

(22) PCT Filed: Jun. 6, 2018

(86) PCT No.: PCT/JP2018/021780
§ 371 (c)(1),
(2) Date: May 9, 2019

(87) PCT Pub. No.: WO2018/230421
PCT Pub. Date: Dec. 20, 2018

(65) Prior Publication Data
US 2019/0263056 A1 Aug. 29, 2019

(30) Foreign Application Priority Data
Jun. 15, 2017 (JP) .............................. JP2017-117487

(51) Int. Cl.
*B29C 64/153* (2017.01)
*B29C 67/00* (2017.01)
(Continued)

(52) U.S. Cl.
CPC .............. *B29C 64/153* (2017.08); *B22F 7/08* (2013.01); *B22F 10/20* (2021.01); *B29C 67/00* (2013.01);
(Continued)

(58) Field of Classification Search
CPC .......... B29C 64/153; B22F 10/20; B22F 7/08; C21D 1/00
See application file for complete search history.

(56) References Cited

U.S. PATENT DOCUMENTS

| | | | |
|---|---|---|---|
| 2014/0356218 A1* | 12/2014 | Berglund | B22F 3/15 419/30 |
| 2017/0151611 A1 | 6/2017 | Secondi et al. | |
| 2018/0133956 A1* | 5/2018 | Buller | B33Y 10/00 |

FOREIGN PATENT DOCUMENTS

| | | | |
|---|---|---|---|
| CN | 105946314 | * | 9/2016 |
| JP | 2007-231349 A | | 9/2007 |

(Continued)

OTHER PUBLICATIONS

English translation of CN 105946314.*
(Continued)

*Primary Examiner* — Larry W Thrower
(74) *Attorney, Agent, or Firm* — Faegre Drinker Biddle & Reath LLP (57) ABSTRACT

A method for manufacturing a shaped article includes a step of providing a high-speed steel powder, a step of forming a powder layer by spreading the powder, a step of forming a solidified layer in which the powder is in a bound state by irradiating the powder layer with a scanning laser beam, and a step of stacking up solidified layers by sequentially repeating the step of forming a powder layer and the step of forming a solidified layer, thereby forming the shaped article. The laser beam has an energy density of 60 J/mm³ or more and less than 600 J/mm³.

7 Claims, 3 Drawing Sheets

(51) Int. Cl.
*C21D 1/00* (2006.01)
*B33Y 40/00* (2020.01)
*B22F 7/08* (2006.01)
*B22F 10/20* (2021.01)
*B33Y 10/00* (2015.01)
*B33Y 80/00* (2015.01)
*C22C 33/02* (2006.01)

(52) U.S. Cl.
CPC ............... *B33Y 40/00* (2014.12); *C21D 1/00* (2013.01); *B22F 2998/10* (2013.01); *B22F 2999/00* (2013.01); *B33Y 10/00* (2014.12); *B33Y 80/00* (2014.12); *C22C 33/02* (2013.01)

(56) References Cited

FOREIGN PATENT DOCUMENTS

| JP | 2011-21218 A | 2/2011 |
|---|---|---|
| JP | 2015-229802 A | 12/2015 |
| JP | 2016-160454 A | 9/2016 |
| JP | 2017-20081 A | 1/2017 |
| JP | 2017-25401 A | 2/2017 |
| WO | WO-2016/012827 A1 | 1/2016 |

OTHER PUBLICATIONS

Notification of the Second Office Action of the corresponding Chinese Patent Application No. 201880004418,6, dated Mar. 17, 2021, and its English translation.
Chen Airong, The common knowledge evidence; Book 1: High Speed Steel, "Principles and Tools of Metal Cutting", Chief Editor Li Xinde, China Commercial Press, published in Sep. 2007.
Xu Zili et al., The common knowledge evidence; Book 2: High Speed Steel, "Engineering Materials", Chief Editor Wu Xiude, Huazhong Universityof Science & Technology Press, Jun. 2012.
Notification of the Second Office Action of the corresponding Chinese Patent Application No. 201880004418.6, dated Jul. 26, 2021, and its English translation.
The common knowledge evidence; Book 3; "Carbide Inhomogeneity," "Metallographic Analysis," Shanghai Jiao Tong University "Metallographic Analysis" editing group, National Defense Industry Press, p. 411, Apr. 1982.

* cited by examiner

METHOD FOR MANUFACTURING SHAPED ARTICLE, AND SHAPED ARTICLE

TECHNICAL FIELD

The present invention relates to a method for manufacturing a shaped article and to a shaped article.

This application claims priority to Japanese Patent Application No. 2017-117487 filed on Jun. 15, 2017, the entire contents of which are incorporated herein by reference.

BACKGROUND ART

Techniques of layering metal powders and forming shapes are disclosed, for example, in PTLs 1 to 3.

CITATION LIST

Patent Literature

PTL 1: Japanese Unexamined Patent Application Publication No. 2011-21218
PTL 2: Japanese Unexamined Patent Application Publication No. 2017-25401
PTL 3: Japanese Unexamined Patent Application Publication No. 2017-20081

SUMMARY OF INVENTION

A method for manufacturing a shaped article according to the present disclosure includes:

a step of providing a high-speed steel powder;
a step of forming a powder layer by spreading the powder;
a step of forming a solidified layer in which the powder is in a bound state by irradiating the powder layer with a scanning laser beam; and
a step of stacking up solidified layers by sequentially repeating the step of forming the powder layer and the step of forming the solidified layer, thereby forming the shaped article,
the laser beam having an energy density of 60 J/mm$^3$ or more and less than 600 J/mm$^3$.

A method for manufacturing a shaped article according to the present disclosure includes:

a step of providing a high-speed steel powder having an average particle size of 20 μm or more and 60 μm or less and a high-speed steel substrate;
a step of forming a powder layer by spreading the powder over the substrate at a layer pitch at least equal to and not more than three times the average particle size;
a step of forming a solidified layer in which the powder is in a bound state by irradiating the powder layer with a scanning laser beam at a power of 100 W or more and 300 W or less; and
a step of stacking up solidified layers on the substrate by sequentially repeating the step of forming the powder layer and the step of forming the solidified layer, thereby forming the shaped article,
the laser beam having an energy density satisfying the following inequality.

$$60 \text{ J/mm}^3 \leq P/(v \times s \times t) < 600 \text{ J/mm}^3$$

P: laser beam power (W)
v: laser beam scanning speed (mm/s)
s: laser beam scanning pitch (mm)
t: layer pitch (mm)

A shaped article according to the present disclosure includes
a stacked portion in which a plurality of layers formed of a high-speed steel are stacked on top of each other.

DESCRIPTION OF EMBODIMENTS

As described in PTLs 1 to 3, additive manufacturing apparatuses (what is called metal 3D printers) for forming shaped articles with three-dimensional shapes by using metal powders as materials have been put to practical use and increasingly used in a wide variety of fields. In an exemplary additive manufacturing method using a metal 3D printer, a metal powder is uniformly spread to form a powder layer, and a predetermined area of the powder layer is irradiated with a scanning laser beam to selectively sinter or melt the metal powder, thereby forming a solidified layer. By repeating this procedure, solidified layers are stacked up one by one, and the multiple solidified layers are laminated and integrated together to form a shaped article with a three-dimensional shape.

Problems to be Solved by Present Disclosure

Additive manufacturing methods allow shaped metal articles with predetermined shapes to be manufactured with high accuracy in relatively short times and thus are expected to be increasingly used in the future. However, metal materials usable for additive manufacturing methods are limited as of now, and in the case of iron-based materials, maraging steel and stainless steel are used for their ease of shaping. Thus, at present, the number of usable iron-based materials is small, and applications of additive manufacturing methods are limited.

There is a desire to apply a technique of layering a metal powder and forming a shape to parts and molds (e.g., molds used for powder metallurgy) that require high hardness and wear resistance, and it is desired to use a high-speed tool steel (herein referred to as "high-speed steel") powder as a material. Actually, however, such a high-speed steel powder has not been used as a material, and a method of layering a high-speed steel powder and forming a shape has yet to be established.

An object of the present disclosure is to provide a method for manufacturing a shaped article made of a high-speed steel powder. Another object of the present disclosure is to provide a high-speed steel shaped article formed by layering a powder.

Advantageous Effects of Present Disclosure

The method for manufacturing a shaped article according to the present disclosure allows the use of a high-speed steel powder as a material. The shaped article according to the present disclosure is formed of a high-speed steel.

Description of Embodiments of Present Invention

The inventors intensively studied and found that a high-speed steel powder is difficult to shape. One reason that a high-speed steel is difficult to shape is that a high-speed steel powder, when irradiated with a laser beam, is hard to sinter or melt, and particles may be insufficiently bound together. In this case, many pores will be formed inside a shaped article, and thus the shaped article disadvantageously has low mechanical properties and is unlikely to have sufficient strength and hardness. Another reason is that high-speed steel has a high carbon content (0.5 mass % or more), and thus when a powder thereof is sintered or melted by irradiation with a laser beam to form a solidified layer, carbides may precipitate in a network in a metallographic structure. If carbides are precipitated in a network, cracks are likely to develop along the carbides, which disadvantageously lead to a shaped article prone to breakage.

The inventors conducted various experiments to enable high-speed steel, which has been found to be difficult to shape, to be used as a material. The inventors focused on the density of energy deposited during shaping and discovered shaping conditions suitable for high-speed steel. First, aspects of the present invention will be described in sequence.

(1) A method for manufacturing a shaped article according to one aspect of the present invention includes:

a step of providing a high-speed steel powder;

a step of forming a powder layer by spreading the powder;

a step of forming a solidified layer in which the powder is in a bound state by irradiating the powder layer with a scanning laser beam; and a step of stacking up solidified layers by sequentially repeating the step of forming a powder layer and the step of forming a solidified layer, thereby forming the shaped article.

The laser beam has an energy density of 60 J/mm³ or more and less than 600 J/mm³.

According to the method for manufacturing a shaped article, the laser beam energy density of 60 J/mm³ or more allows the high-speed steel powder, when the layer thereof is irradiated with the laser beam, to be easily sintered or melted to form a solidified layer in which particles are bound together and can achieve a reduction in shaped article porosity. Thus, a high-density shaped article with few pores can be formed, and a shaped article with high strength and high hardness can be obtained. The reduction in shaped article porosity leads to an increase in shaped article strength and can inhibit cracking that may occur due to a thermal stress caused by a thermal strain generated inside the shaped article during the shaping process or a transformation stress caused by heat treatment. The laser beam energy density of less than 600 J/mm³ can inhibit carbides from precipitating in a network in a metallographic structure during shaping and reduces the likelihood of cracking and breakage of a shaped article. In addition, when the energy density is less than 600 J/mm³, the powder in a laser-beam-irradiated area can be inhibited from being excessively melted, solidified layers are easily stacked up at a predetermined layer pitch, and the shape accuracy of the shaped article can be maintained. Therefore, the method for manufacturing a shaped article allows the use of a high-speed steel powder as a material and enables a high-density shaped article with few pores to be manufactured with good shape accuracy.

As used herein, the term "laser beam energy density" refers to the amount of energy deposited per unit volume in a laser-beam-irradiated area and is calculated by the following formula from laser beam power, laser beam scanning speed, laser beam scanning pitch, and layer pitch.

$$E=P/(v \times s \times t)$$

E: laser beam energy density (J/mm³)
P: laser beam power (W)
v: laser beam scanning speed (mm/s)
s: laser beam scanning pitch (mm)
t: layer pitch (mm)

(2) In one aspect of the method for manufacturing a shaped article, the power of the laser beam is 100 W or more.

The high-speed steel powder reflects part of the laser beam applied, and thus, if the laser beam power (laser power) is low, the powder cannot be efficiently heated to a temperature at which the powder is sintered or melted. The laser power of 100 W or more enables the powder to be efficiently heated, allows the powder to be easily sintered or melted, and assists in inhibiting the formation of pores.

(3) In one aspect of the method for manufacturing a shaped article, the method includes a step of tempering the shaped article.

When the high-speed steel powder, after being irradiated with the laser beam, is sintered or melted and then quenched, the structure of the powder is transformed into martensite. In the state of a shaped article, a martensitic structure is formed. In this transformation, the austenite structure (retained austenite) may partially remain without wholly transforming into the martensitic structure. Tempering the shaped article causes precipitation of carbides and transformation of retained austenite into martensite, whereby the hardness of the shaped article can be improved.

(4) A method for manufacturing a shaped article according to one aspect of the present invention includes:

a step of providing a high-speed steel powder having an average particle size of 20 µm or more and 60 µm or less and a high-speed steel substrate;

a step of forming a powder layer by spreading the powder over the substrate at a layer pitch at least equal to and not more than three times the average particle size;

a step of forming a solidified layer in which the powder is in a bound state by irradiating the powder layer with a scanning laser beam at a power of 100 W or more and 300 W or less; and a step of stacking up solidified layers on the substrate by sequentially repeating the step of forming a powder layer and the step of forming a solidified layer, thereby forming the shaped article.

The laser beam has an energy density satisfying the following inequality.

$$60 \text{ J/mm}^3 \leq P/(v \times s \times t) < 600 \text{ J/mm}^3$$

P: laser beam power (W)
v: laser beam scanning speed (mm/s)
s: laser beam scanning pitch (mm)
t: layer pitch (mm)

According to the method for manufacturing a shaped article, a high-speed steel shaped article is formed on a high-speed steel substrate, whereby a shaped article integrated with the substrate can be manufactured. The method for manufacturing a shaped article, as with the manufacturing method described in (1) above, allows the use of a high-speed steel powder as a material and enables a high-density shaped article with few pores to be manufactured with good shape accuracy. The method can also inhibit carbides from precipitating in a network in the structure of a shaped article and reduces the likelihood of cracking and breakage of a shaped article.

(5) A shaped article according to one aspect of the present invention has
a stacked portion in which a plurality of layers formed of a high-speed steel are stacked on top of each other.

The shaped article is a high-speed steel shaped article formed by layering a powder and has a stacked portion in which a plurality of layers formed of a high-speed steel are stacked on top of each other. The shaped article is formed of a high-speed steel and thus can be used, for example, as a part or a mold (e.g., a mold used for powder metallurgy) that requires high hardness and wear resistance.

(6) In one aspect of the shaped article, the stacked portion has a porosity of 25% or less and a structure in which carbides are precipitated in a dispersed manner.

According to this aspect, since the stacked portion constituting the shaped article has a porosity of 25% or less, the shaped article has few pores and is highly dense. Thus, the shaped article can be provided with high strength and high hardness. The reduction in shaped article porosity leads to an increase in shaped article strength and can inhibit cracking. According to this aspect, carbides are precipitated in the structure not in a network but in a dispersed manner, and thus the shaped article is less prone to cracking and breakage.

(7) In one aspect of the shaped article, the stacked portion has a martensitic structure with an area fraction of 99% or more.

According to this aspect, having a martensitic structure of 99% or more can improve the hardness of the shaped article.

(8) In one aspect of the shaped article, the shaped article includes a substrate formed of a high-speed steel, and the stacked portion is formed on the substrate.

According to this aspect, since the stacked portion is formed on the substrate formed of a high-speed steel, a high-speed steel shaped article integrated with the high-speed steel substrate is provided. Since the substrate and the stacked portion are formed of high-speed steels, the substrate and the stacked portion fit well with each other, and the shaped article is firmly joined to the substrate.

(9) In one aspect of the shaped article, the substrate and the stacked portion are formed of high-speed steels having different compositions, and the stacked portion includes, near its interface with the substrate, a compositionally graded layer in which compositions of the layers become closer to the composition of the substrate toward the substrate.

According to this aspect, a shaped article is provided in which the stacked portion includes the compositionally graded layer near the interface between the substrate and the stacked portion. The reason why the compositionally graded layer is formed in the stacked portion is that components of the substrate are diffused into the layers and, as a result, the compositions of the layers nearer to the substrate become closer to the composition of the substrate.

Details of Embodiments of Present Invention

Specific examples of a method for manufacturing a shaped article and a shaped article according to embodiments of the present invention will be described below. It should be understood that the present invention is not limited to these examples; rather, the present invention is defined by the claims, and all changes which come within the meaning and range of equivalency of the claims are intended to be embraced therein.

<Method for Manufacturing Shaped Article>

In a method for manufacturing a shaped article according to an embodiment, a high-speed steel powder is used as a material, and the high-speed steel powder is irradiated with a laser beam to form a shape, thereby manufacturing a high-speed steel shaped article. More specifically, a predetermined area of a powder layer formed of a uniformly spread high-speed steel powder is irradiated with a scanning laser beam to sinter or melt the powder in the laser-beam-irradiated area, thereby forming a solidified layer in which particles of the powder are bound together. By sequentially repeating this, solidified layers are stacked up to form a shaped article.

The method for manufacturing a shaped article according to the embodiment includes the following steps.

1. A step of providing a high-speed steel powder
2. A step of forming a powder layer by spreading the high-speed steel powder
3. A step of forming a solidified layer in which the powder is in a bound state by irradiating the high-speed steel powder layer with a scanning laser beam
4. A step of stacking up solidified layers by sequentially repeating the step of forming a powder layer and the step of forming a solidified layer, thereby forming the shaped article One feature of the manufacturing method according to the embodiment is that the laser beam has an energy density of 60 J/mm$^3$ or more and less than 600 J/mm$^3$. The method for manufacturing a shaped article according to the embodiment will hereinafter be described in detail.

(High-Speed Steel Powder)

The high-speed steel powder used as a material in the manufacturing method according to the embodiment may be a known material. High-speed steels are alloys of Fe and alloying elements such as C, Si, Mn, Cr, W, Mo, V, and Co and are of two types, W-type and Mo-type, which are defined in JIS G4403:2015. Representative examples of W-type high-speed steels includes SKH2, which contains about 18 mass % of W and no Mo, and representative examples of Mo-type high-speed steels includes SKH40 and SKH51, which contain about 6 mass % of W and about 5 mass % of Mo. The high-speed steel may be a steel defined in JIS, a steel defined in the American Iron and Steel Institute (AISI) standard (representative example: M2 (corresponding to SKH51)), or a steel developed by a manufacturer, such as YXR3 or HAP 10 manufactured by Hitachi metals Tool Steel, Ltd. When a high-speed steel is used as a substrate that supports a shaped article during shaping, the steel type (components) of the high-speed steel powder may be the same as or different from that of the substrate. When the high-speed steel powder and the substrate are of the same steel type, the shaped article and the substrate fit well with each other.

For chemical components of the high-speed steel, exemplary contents (unit: mass %) of the alloying elements described above are given below.

C: 0.5 or more and 2.1 or less, furthermore, 0.6 or more and 1.6 or less
Si: 0.2 or more and 1.5 or less, furthermore, 0.7 or less
Mn: 0.3 or more and 0.5 or less, furthermore, 0.4 or less
Cr: 3.0 or more and 5.0 or less, furthermore, 3.5 or more and 4.5 or less
W:
(W-type) 11.0 or more and 19.0 or less, furthermore, 17.0 or more (Mo-type) 0 or more and 10.0 or less, furthermore, 2.0 or more and 8.0 or less Mo: 2.0 or more and 10.0 or less, furthermore, 2.5 or more and 6.0 or less V: 1.0 or more and 5.0 or less, furthermore, 4.0 or less Co: 0 or more and 11.0 or less, furthermore, 10.0 or less For ease of shaping, the average particle size of the high-speed steel powder may be, for example, 10 μm or more and 100 μm or less, furthermore, 20 μm or more and 60 μm or less. The term "average particle size" refers to a particle size at which the accumulated volume reaches 50% in a volume particle size distribution measured using a laser diffraction particle size distribution analyzer, that is, a median diameter (D50). The particle shape of the high-speed steel powder is preferably spherical, and the high-speed steel powder is preferably a gas-atomized powder prepared, for example, by gas atomization.

The manufacturing method according to the embodiment can be practiced by using a known additive manufacturing apparatus (metal 3D printer). Examples of commercially available metal 3D printers include OPM250L manufactured by Sodick Co., Ltd. and ProX DMP200 manufactured by 3D Systems, Inc.

In the manufacturing method according to the embodiment, when a high-speed steel shaped article is formed on a high-speed steel substrate, the high-speed steel powder and the high-speed steel substrate are provided. In this case, a shaped article integrated with the substrate can be manufactured.

In the step of forming a powder layer, the powder layer is preferably formed by spreading the powder at a layer pitch at least equal to and not more than three times the average particle size of the powder. The layer pitch at least equal to and not more than three times the average particle size of the powder increases the likelihood that a powder layer with a thin and uniform thickness is formed. Here, the layer pitch is regarded as a thickness of a powder layer. For example, the layer pitch is preferably at least 1.2 times and not more than twice the average particle size of the powder.

(Energy Density)

In the step of forming a solidified layer in the manufacturing method according to the embodiment, the laser beam energy density is 60 J/mm$^3$ or more and less than 600 J/mm$^3$. The laser beam energy density is an energy density in a laser-beam-irradiated area. The energy density of 60 J/mm$^3$ or more allows the high-speed steel powder to be easily sintered or melted to form a solidified layer in which particles are bound together and can achieve a reduction in shaped article porosity. Thus, a high-density shaped article with few pores can be formed, and a shaped article with high strength and high hardness can be obtained. The reduction in shaped article porosity leads to an increase in shaped article strength and can inhibit cracking that may occur due to a thermal stress (thermal strain) accumulated during the shaping process or a transformation stress caused by heat treatment.

Specifically, the shaped article porosity can be 25% or less, and the shaped article relative density can be 75% or more. The "shaped article porosity" can be determined by observing a section of a shaped article with a microscope and determining the area percentage (%) of pores in the observed area. The size of the observed area may be, for example, 250 μm or more×250 μm or more, furthermore, 500 μm or more×500 μm or more. The "shaped article relative density" is calculated from the porosity in the section of the shaped article (relative density=1−porosity). For example, the shaped article porosity is preferably 20% or less (relative density: 80% or more), more preferably 10% or less (relative density: 90% or more).

The energy density of less than 600 J/mm$^3$ can inhibit carbides from precipitating in a network in a metallographic structure during shaping and reduces the likelihood of cracking and breakage of a shaped article. In addition, when the energy density is less than 600 J/mm$^3$, the powder in a laser-beam-irradiated area can be inhibited from being excessively melted, solidified layers are easily stacked up at a predetermined layer pitch, and the shape accuracy of the shaped article can be maintained.

Here, the probable reason why carbides precipitate in a network when the energy density is high is as follows. As the energy density increases, the temperature excessively increases not only in a laser-beam-irradiated area but also at the periphery (e.g., a previously formed solidified layer, surrounding powder, and the substrate supporting a shaped article) of the laser-beam-irradiated area due to heat conduction, and thus, after the irradiation with the laser beam, the sintered or melted powder in the laser-beam-irradiated area is cooled at a slow speed. As a result, when a high-speed steel powder with a high carbon (C) content is used as a material, carbides are likely to form in large quantities in a metallographic structure during shaping, leading to precipitation of the carbides in a network. When the energy density is reduced to some degree, the excessive temperature increase at the periphery of the laser-beam-irradiated area can be inhibited, and the sintered or melted powder is cooled at a fast speed. As a result, carbides are unlikely to form in a metallographic structure and tend to be finely dispersed rather than precipitate in a network. Carbides that precipitate are compounds of alloying elements and carbon. Examples include Mo$_2$C, W$_2$C, and VC.

A more preferred energy density is, for example, 80 J/mm$^3$ or more and 500 J/mm$^3$ or less, furthermore, 120 J/mm$^3$ or more and 450 J/mm$^3$ or less. An energy density of 80 J/mm$^3$ or more, furthermore, 120 J/mm$^3$ or more, increases the likelihood that the high-speed steel powder is sufficiently sintered or melted and can more effectively inhibit the formation of pores. As a result, the shaped article porosity can be further reduced. For example, the shaped article porosity can be 20% or less (relative density: 80% or more), furthermore, 10% or less (relative density: 90% or more). In this case, the shaped article strength further increases with decreasing porosity, and cracking that may occur due to a thermal stress (thermal strain) or a transformation stress can be effectively inhibited. An energy density of 500 J/mm$^3$ or less, furthermore, 450 J/mm$^3$ or less, can more effectively inhibit the formation of carbides and allows carbides to precipitate in a more finely dispersed state. In this case, excessive melting of the powder can be more effectively inhibited, and the shape accuracy of the shaped article can be more improved.

The energy density can be controlled by changing shaping conditions such as laser beam power, laser beam scanning speed, laser beam scanning pitch, and layer pitch. The laser beam power, the laser beam scanning speed, the laser beam scanning pitch, and the layer pitch may be appropriately set so that the energy density will be 60 J/mm$^3$ or more and less than 600 J/mm$^3$. For example, the laser power may be set to 10 W or more and 1000 W or less, the scanning speed may be set to 10 mm/s or more and 2000 mm/s or less, the scanning pitch may be set to 0.01 mm or more and 0.2 mm or less, and the layer pitch may be set to 0.01 mm or more and 0.1 mm or less. Preferably, the laser beam power is 50 W or more, the laser beam scanning speed is 50 mm/s or more, the laser beam scanning pitch is 0.05 mm or more, and the layer pitch is 0.02 mm or more. The layer pitch can be varied by using a powder having a particle size corresponding to the desired layer pitch.

(Laser Beam Power)

The laser beam power is more preferably 100 W or more. A laser beam power of 100 W or more enables the powder to be efficiently heated, allows the powder to be easily sintered or melted, and assists in inhibiting the formation of pores. The upper limit of the laser beam power may be, for example, 300 W or less.

(Type of Laser Beam)

The laser beam may be of any type as long as it is able to melt or sinter the high-speed steel powder. For example, a fiber laser, a YAG laser, or a $CO_2$ laser can be used. In particular, a fiber laser is suitable because it provides a small laser-spot size and a high power. One example of such a fiber laser is an Yb fiber laser (wavelength: 1070 nm).

(Tempering Treatment)

The method may include a step of tempering the shaped article that has been formed. Tempering the shaped article transforms retained austenite into martensite, whereby the hardness of the shaped article can be improved. For the tempering conditions, the heating temperature may be, for example, 530° C. or higher and 630° C. or lower. The holding time, although depending on the size of the shaped article, may be, for example, 1 hour or more and 4 hours or less, preferably 2 hours or more. In the tempering treatment, the heating and holding is followed by cooling to a temperature (e.g., 80° C. or lower) equal to or lower than a martensitic transformation finish temperature (Mf point).

The tempering treatment is preferably performed more than once, more preferably performed three times. By the first tempering treatment, carbides are precipitated, and retained austenite is transformed into martensite. By the second tempering treatment, the martensitic structure formed by the first tempering treatment can be tempered and stabilized. The third tempering treatment is for the purpose of stress relief, and the heating temperature may be, for example, a temperature (480° C. or higher and 600° C. or lower) about 30° C. to 50° C. lower than the above-described heating temperature. By performing the tempering treatment more than once, a sufficient martensitic structure can be obtained, and, for example, a shaped article having a martensitic structure with an area fraction of 99% or more can be manufactured. This can further improve the hardness of the shaped article. The "martensitic structure area fraction" can be determined by observing a section of the shaped article with a scanning electron microscope (SEM) and calculating the area percentage (%) of a martensitic structure in a metallographic structure in the observed area by using image analysis software. The size of the observed area may be, for example, 250 μm or more×250 μm or more, furthermore, 500 μm or more×500 μm or more.

Without a tempering treatment, the surface hardness (HRC: Rockwell C scale hardness) of the shaped article is, for example, 50 HRC or more, furthermore, 55 HRC or more, whereas with tempering treatments, the surface hardness of the shaped article can be, for example, 55 HRC or more, furthermore, 60 HRC or more.

{Effects of Method for Manufacturing Shaped Article}

The method for manufacturing a shaped article according to the embodiment described above can achieve a reduction in shaped article porosity, can form a high-density shaped article with few pores, and thus can provide a shaped article with high strength and high hardness. The method can inhibit carbides from precipitating in a network in a metallographic structure during shaping and reduces the likelihood of cracking and breakage of a shaped article. The method can also inhibit excessive melting of a powder and can maintain the shape accuracy of a shaped article. Therefore, the method allows the use of a high-speed steel powder as a material and enables a high-density shaped article with few pores to be manufactured with good shape accuracy.

{Applications of Method for Manufacturing Shaped Article}

The method for manufacturing a shaped article according to the embodiment can be used to manufacture a high-speed steel shaped article.

<Shaped Article>

Figure 4:
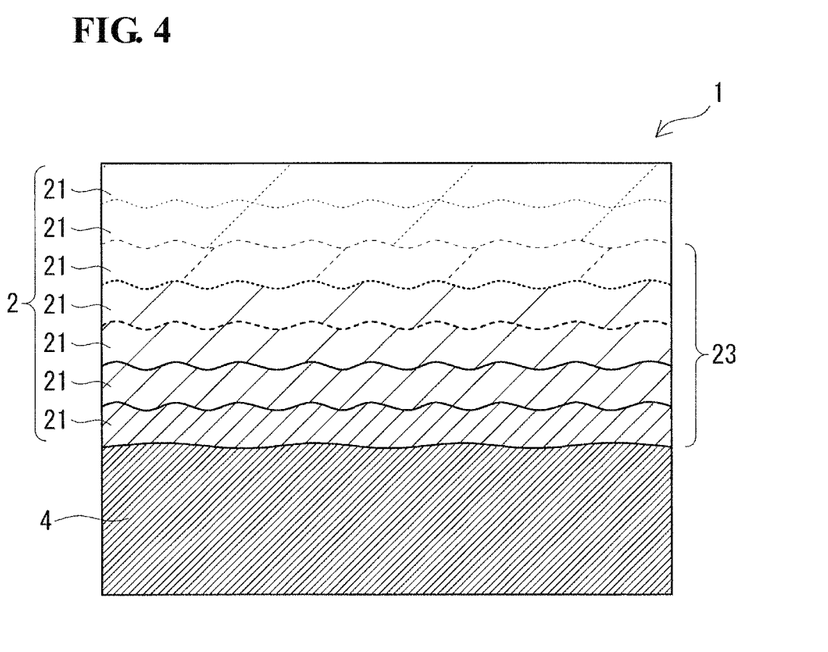
FIG. 4 schematically illustrates a section of a shaped article according to an embodiment.

A shaped article according to an embodiment will be described with reference to FIG. 4. As illustrated in FIG. 4, a shaped article 1 has a stacked portion 2 in which a plurality of layers 21 formed of a high-speed steel are stacked on top of each other. The shaped article 1 illustrated in FIG. 4 includes a substrate 4 formed of a high-speed steel, and the stacked portion 2 is formed on the substrate 4. FIG. 4 schematically illustrates a section of the vicinity of the interface between the substrate 4 and the stacked portion 2. The shaped article 1 can be manufactured by the method for manufacturing a shaped article according to the embodiment described above.

(Stacked Portion)

The stacked portion 2 is formed in such a manner that a powder layer formed of a spread high-speed steel powder is irradiated with a laser beam to form a solidified layer and the formation of a powder layer and the formation of a solidified layer are sequentially repeated to stack up a plurality of solidified layers. The layers 21 are formed of a high-speed steel. The thickness of the layers 21 depends on the average particle size of the high-speed steel powder used as a material, the thickness of the powder layer, and other factors, and is, for example, 10 μm or more and 100 μm or less, furthermore, 20 μm or more and 60 μm or less.

Preferably, the stacked portion 2 has a porosity of 25% or less (in other words, the stacked portion 2 has a relative density of 75% or more). This improves the strength and the hardness of the stacked portion 2 and can inhibit cracking. More preferably, the stacked portion 2 has a porosity of 20% or less (a relative density of 80% or more), furthermore, a porosity of 10% or less (a relative density of 90% or more). The porosity and the relative density of the stacked portion 2 are determined in the same manner as the "shaped article porosity" and the "shaped article relative density" described in the section of the above manufacturing method according to the embodiment.

The stacked portion 2 preferably has a structure in which carbides are precipitated in a dispersed manner. When carbides are precipitated in a dispersed manner in the structure, as compared to when carbides are precipitated in a network, cracking and breakage are less likely to occur. To inhibit cracking and breakage, carbides are preferably finely dispersed in the structure, and the maximum length of carbides in the structure is preferably 5 μm or less, more preferably 1 μm or less. The "maximum length of carbides" can be determined by observing a section of the stacked portion 2 with a scanning electron microscope (SEM) and measuring the maximum length of carbides present in the observed area by using image analysis software. The size of the observed area may be, for example, 10 μm or more×20 μm or more, furthermore, 20 μm or more×20 μm or more.

The stacked portion 2 preferably has a martensitic structure with an area fraction of 90% or more, furthermore, 99% or more. This can further improve the hardness of the shaped article.

The shaped article 1 according to the embodiment is integrated with the substrate 4 because the stacked portion 2 is formed on the high-speed steel substrate 4. The stacked portion 2 is directly joined to the substrate 4. Since the substrate 4 and the stacked portion 2 are formed of high-speed steels, the substrate 4 and the stacked portion 2 fit well with each other, and the stacked portion 2 is firmly joined to the substrate 4. The substrate 4 and the stacked portion 2 may be formed of high-speed steels having the same composition or may be formed of high-speed steels having different compositions. In this embodiment, the substrate 4 and the stacked portion 2 are formed of high-speed steels having different compositions.

When the stacked portion 2 is formed of a high-speed steel having a composition different from that of the substrate 4, the stacked portion 2 includes, near its interface with the substrate, a compositionally graded layer 23 in which compositions of the layers 21 become closer to the composition of the substrate 4 toward the substrate 4, as illustrated in FIG. 4. The reason why the compositionally graded layer 23 is formed in the stacked portion 2 is that components of the substrate 4 are diffused into the layers 21 during shaping, as a result of which the compositions of the layers 21 nearer to the substrate 4 become closer to the composition of the substrate 4. Thus, in the compositionally graded layer 23, the layers 21 distinctly differ in composition, and boundaries between the layers 21 are clear due to the compositional difference. By contrast, the layers 21 above the compositionally graded layer 23 and remote from the substrate 4 have a uniform composition, and the boundary between the layers 21 defined by compositional difference is unclear. In FIG. 4, denser hatching lines in the layers 21 of the stacked portion 2 indicate being closer to the composition of the substrate 4, and as the boundary between the layers 21 changes from a thick solid line to a thin dashed line, the boundary between the layers 21 becomes unclear.

When the stacked portion 2 is formed of a high-speed steel having the same composition as the substrate 4, the layers 21 have a uniform composition near the interface between the stacked portion 2 and the substrate. Thus, boundaries between the layers 21 defined by compositional difference are unclear, as compared to the case of a composition different from that of the substrate 4.

{Effects of Shaped Article}

The shaped article 1 according to the embodiment described above includes the stacked portion 2 in which the plurality of layers 21 formed of a high-speed steel are stacked on top of each other. The shaped article 1 is formed of a high-speed steel and thus can be used, for example, as a part or a mold (e.g., a mold used for powder metallurgy) that requires high hardness and wear resistance.

Test Example 1

Using a high-speed steel powder as a material, stacked portions were formed on substrates with varying laser beam energy densities. Specifically, a high-speed steel powder was spread over a substrate to form a powder layer, and a predetermined area of the powder layer was irradiated with a scanning laser beam to form a solidified layer. This procedure was repeated to stack up solidified layers, thereby forming a high-speed steel shaped article.

The substrate used was a 10-mm-thick plate formed of a high-speed steel (YXR3 manufactured by Hitachi metals Tool Steel, Ltd). The high-speed steel powder used was an M2 powder manufactured by Höganäs. The high-speed steel powder is a gas-atomized powder and has an average particle size (D50) of 40 μm. Chemical components of the steels are shown in Table 1.

TABLE 1

| Steel type | Chemical components (mass %) | | | | | | | |
|---|---|---|---|---|---|---|---|---|
| | Fe | C | Si | Mn | Cr | W | Mo | V |
| YXR3 | Bal. | 0.6 | 1.5 | 0.4 | 4.3 | — | 2.9 | 1.8 |
| M2 | Bal. | 0.9 | 0.2 | 0.3 | 4.3 | 6.0 | 5.1 | 1.8 |

A metal 3D printer (ProX DMP200) manufactured by 3D Systems, Inc. was used for shaping. In shaping, a 5 mm square area on the substrate was used as a shaping area, and the printer was set to form a shaped article 2 mm high. To make it easier to spread a powder for a first layer on the substrate, a surface of the substrate was pretreated by shot blasting.

Among the shaping conditions, the laser beam power and the laser beam scanning speed were varied to control the energy density. The laser beam power and the laser beam scanning speed were varied within the range of 150 to 300 W and the range of 200 to 2000 mm/s, respectively. The laser beam scanning pitch and the layer pitch were fixed at 0.04 mm and 0.05 mm, respectively, and the number of layers were 40 (0.05 mm [layer pitch]×40 [the number of layers]=2 mm [set height]). The spot size was set to 0.05 mm. In this Example, the square area was diagonally scanned with the laser beam, and the scanning direction was rotated by 90° for each layer.

Shaping was performed under the shaping conditions shown in Table 2 to manufacture shaped articles of sample Nos. 1-1 to 1-9.

TABLE 2

| Sample No. | Laser beam power [W] | Scanning speed [mm/s] | Scanning pitch [mm] | Layer pitch [mm] | Energy density [J/mm³] |
|---|---|---|---|---|---|
| 1-1 | 150 | 200 | 0.04 | 0.05 | 375 |
| 1-2 | 150 | 800 | 0.04 | 0.05 | 94 |
| 1-3 | 240 | 800 | 0.04 | 0.05 | 150 |
| 1-4 | 240 | 2000 | 0.04 | 0.05 | 60 |
| 1-5 | 300 | 800 | 0.04 | 0.05 | 188 |
| 1-6 | 300 | 2000 | 0.04 | 0.05 | 75 |
| 1-7 | 150 | 2000 | 0.04 | 0.05 | 38 |
| 1-8 | 240 | 200 | 0.04 | 0.05 | 600 |
| 1-9 | 300 | 200 | 0.04 | 0.05 | 750 |

The following evaluations were performed on the sample shaped articles (stacked portions) obtained.

(Shape Accuracy)

The actual height of each shaped article was measured, and shape accuracy was evaluated based on the measured height of the shaped article. The nearer the actual height of a shaped article is to the set height, the better the shape accuracy of the shaped article is. The evaluation criteria of shape accuracy are as follows: A, the difference between the set height and the actual height of a shaped article is within 5% of the set height; B, the difference is less than 5% of the set height. In this Example, the set height of a shaped article is 2 mm, and thus the criteria are as follows: A, the height of a shaped article obtained is 1.9 mm or more; B, the height is less than 1.9 mm. The height and the evaluation result of shape accuracy of each shaped article are shown in Table 3.

(Structure)

A section of each shaped article was polished, and a backscattered electron image of the section was captured with a scanning electron microscope (SEM). The metallographic structure was observed to examine the state of precipitation of carbides in the metallographic structure, and the structure was evaluated based on the state of precipitation of carbides. The section of the shaped article was a longitudinal section taken along a plane parallel to the height direction of the shaped article. The evaluation criteria of the structure are as follows: A, no carbides can be found or carbides are finely dispersed; B, carbides are precipitated in a network. The evaluation result of the structure of each shaped article is shown in Table 3.

Figure 1:
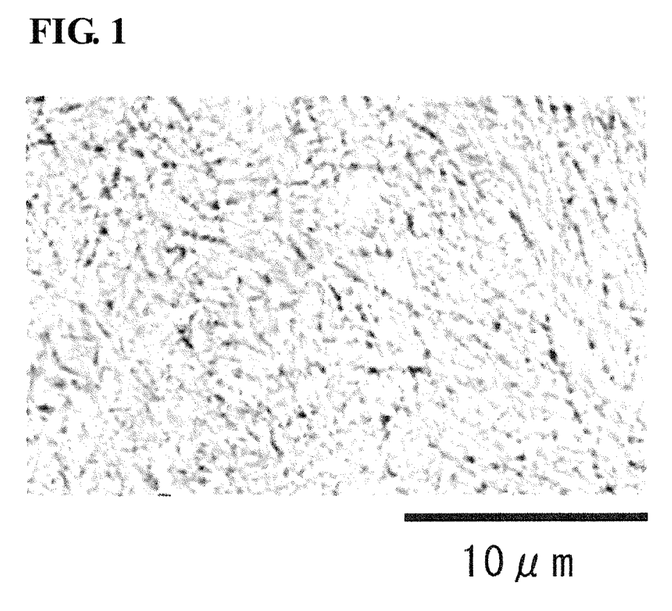
FIG. 1 shows a backscattered electron image of a section of sample No. 1-3.
Figure 2:
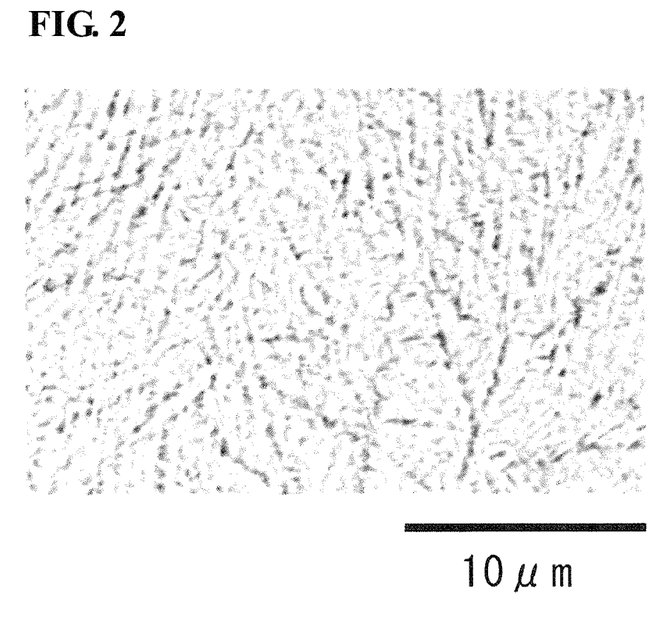
FIG. 2 shows a backscattered electron image of a section of sample No. 1-7.
Figure 3:
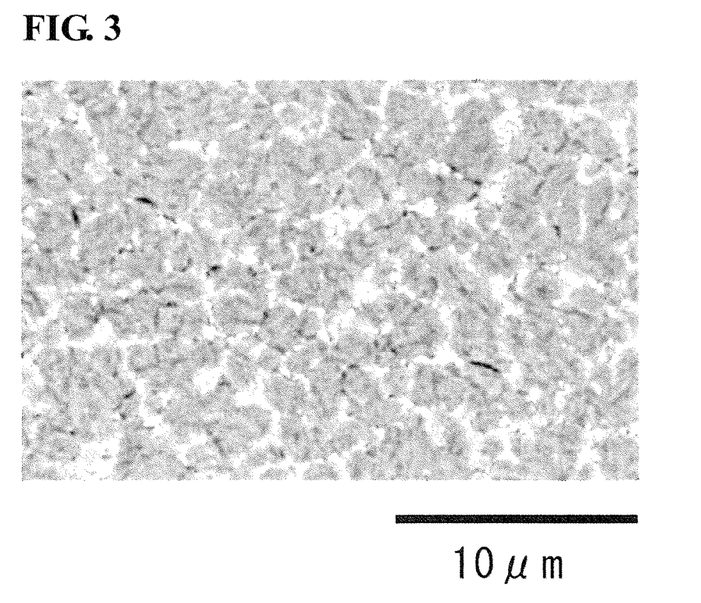
FIG. 3 shows a backscattered electron image of a section of sample No. 1-9.

FIG. 1 to FIG. 3 are backscattered electron images of sample Nos. 1-3 (energy density: 150 J/mm$^3$), 1-7 (energy density: 38 J/mm$^3$), and 1-9 (energy density: 750 J/mm$^3$), respectively. In the backscattered electron images, carbides appear whitish. FIG. 3 shows that carbides (white parts) are connectedly formed in a network in sample No. 1-9. FIG. 1 shows that carbides are finely dispersed in sample No. 1-3. FIG. 2 shows that no carbides are observed and can be found in sample No. 1-7.

(Porosity and Relative Density)

The porosity and the relative density of each shaped article were evaluated. The porosity was determined by observing and capturing a section of the shaped article with a light microscope, and analyzing the captured image to calculate the area percentage (%) of pores in the observed area. The relative density was calculated by (1−porosity). The porosity and the relative density of each shaped article are shown in Table 3.

(Presence of Cracks)

The presence of cracks in each shaped article was evaluated. The evaluation criteria of the presence of cracks are as follows: A, no cracks are observed when a surface of a shaped article is observed with a light microscope; B, cracks are observed. The presence of cracks in each shaped article is shown in Table 3.

(Surface Hardness)

The surface hardness of each shaped article was evaluated according to the Rockwell C scale (HRC). For the evaluation of surface hardness, the hardness of the top surface of the shaped article was measured at three points, and the measurements were averaged. Furthermore, the shaped article was tempered and evaluated for post-tempering surface hardness. The tempering treatment was performed three times. The conditions of the first and second tempering treatments were as follows: heating temperature, 550° C.; holding time, 2 hours; slow cooling to room temperature (30° C.) after heating and holding. The conditions of the third tempering treatment were as follows: heating temperature, 520° C.; holding time, 2 hours; slow cooling to room temperature (30° C.) after heating and holding. The pre-tempering and post-tempering surface hardnesses of each shaped article are shown in Table 3. Sample No. 1-7 was fragile before being tempered, and thus the hardness could not be measured.

TABLE 3

| Sample No. | Energy density [J/mm$^3$] | Shaped article height [mm] | Shape accuracy | Structure | Porosity [%] | Relative density [%] | Presence of cracks | Surface hardness [HRC] Pre-tempering | Surface hardness [HRC] Post-tempering |
|---|---|---|---|---|---|---|---|---|---|
| 1-1 | 375 | 1.9 | A | A | 4 | 96 | A | 62.7 | 71.1 |
| 1-2 | 94 | 1.9 | A | A | 16 | 84 | A | 52.7 | 57.3 |
| 1-3 | 150 | 1.9 | A | A | 7 | 93 | A | 55.3 | 70.9 |
| 1-4 | 60 | 1.9 | A | A | 23 | 77 | B | 54.7 | 64.7 |
| 1-5 | 188 | 1.9 | A | A | 6 | 94 | A | 59.5 | 71.2 |
| 1-6 | 75 | 1.9 | A | A | 21 | 79 | B | 56.1 | 62.5 |
| 1-7 | 38 | 2 | A | A | 53 | 47 | B | — | 47.2 |
| 1-8 | 600 | 1 | B | B | 5 | 95 | A | 62.2 | 66.8 |
| 1-9 | 750 | 1 | B | B | 4 | 96 | B | 61 | 66.3 |

The results in Table 3 show that sample Nos. 1-1 to 1-6, each being manufactured at an energy density of 60 J/mm$^3$ or more and less than 600 J/mm$^3$, have porosities of 25% or less (relative densities of 75% or more) and good shape accuracy. The hardnesses of Sample Nos. 1-1 to 1-6 have been improved by tempering the shaped articles, that is, their post-tempering surface hardnesses are 55 HRC or more. In particular, sample Nos. 1-1 to 1-3 and 1-5 have porosities of 20% or less (relative densities of 80% or more), indicating greater reductions in porosity and effective inhibition of cracking.

In addition, sample Nos. 1-1 to 1-6, in which cracking and breakage are unlikely to occur along carbides because the carbides are not precipitated in a network but finely dispersed in the metallographic structure, are presumed to have high shock resistance.

Sample No. 1-7 manufactured at a low energy density, although having good shape accuracy, has a porosity of 50% or more (a relative density of 50% or less), indicating the formation of many pores and no reduction in porosity. In addition, sample No. 1-7, for its many pores and low density, has low strength and low hardness.

Sample Nos. 1-8 and 1-9 manufactured at high energy densities have reduced porosities, but their shape accuracy is significantly degraded and not maintained. In addition, sample Nos. 1-8 and 1-9, in which cracking and breakage are likely to occur along carbides because the carbides are precipitated in a network in the metallographic structure, are presumed to have poor shock resistance.

Test Example 2

The same high-speed steel powder (M2 manufactured by Höganäs) having an average particle size (D50) of 40 μm and the same substrate formed of a high-speed steel (YXR3 manufactured by Hitachi metals Tool Steel, Ltd.) as used in Test Example 1 were provided. As in Test Example 1, the high-speed steel powder was layered and shaped on the high-speed steel substrate by using a metal 3D printer, to thereby form a high-speed steel shaped article on the substrate. In this manner, a shaped article having a stacked portion in which a plurality of layers formed of a high-speed steel are stacked on top of each other was formed on a substrate. The shaping conditions were the same as those for sample No. 1-3 in Test Example 1. The shaped article obtained was tempered. The tempering treatment was performed three times, and the conditions of the tempering treatment were the same as in Test Example 1. This shaped article is sample No. 2-1.

The following evaluations were performed on sample No. 2-1.

(Porosity and Relative Density)

The porosity and the relative density of the stacked portion constituting the shaped article were determined in the same manner as in Test Example 1. The stacked portion of sample No. 2-1 had a porosity of 10% or less (a relative density of 90% or more).

(Maximum Length of Carbides)

As in Test Example 1, a section of the stacked portion of the shaped article was observed with a SEM, and its backscattered electron image was captured to examine the state of precipitation of carbides in the metallographic structure. In the stacked portion of sample No. 2-1, carbides were not precipitated in a network but finely dispersed in the structure. The captured image was analyzed to determine the maximum length of carbides present in the observed area. Specifically, the image was binarized, and the binarized image was processed using image analysis software (e.g., National Institutes of Health ImageJ) to measure the maximum length of carbides. The maximum length of carbides was 1 μm or less.

(Martensitic Structure Area Fraction)

The martensitic structure area fraction in the stacked portion of the shaped article was evaluated. The martensitic structure area fraction was determined by observing and capturing a section of the stacked portion with a SEM, and analyzing the captured image to calculate the area percentage (%) of a martensitic structure in the metallographic structure in the observed area. Here, the area of the martensitic structure in the image was marked with a pen and processed with image analysis software (e.g., National Institutes of Health ImageJ) to determine the area percentage (%). The martensitic structure area fraction in the stacked portion of sample No. 2-1 was 99% or more.

Figure 5:
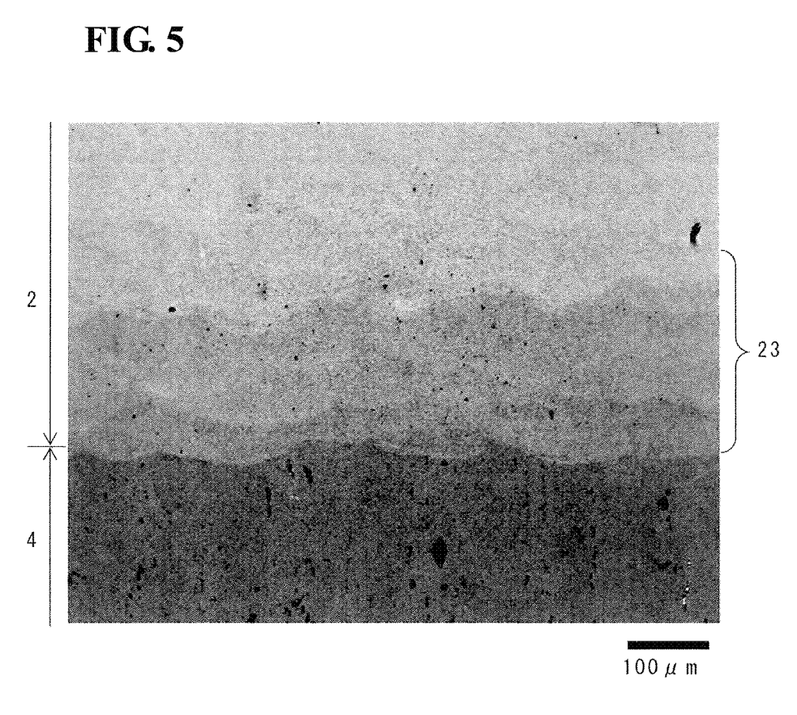
FIG. 5 shows a backscattered electron image of a section of the vicinity of the interface between a substrate and a stacked portion of sample No. 2-1.

For sample No. 2-1, the shaped article was cut perpendicularly to the top surface of the substrate along the stacking direction of the stacked portion. A section of the vicinity of the interface between the substrate and the stacked portion was observed with a SEM, and its backscattered electron image was captured. FIG. 5 is the backscattered electron image of the section of the vicinity of the interface between the substrate and the stacked portion. In FIG. 5, the lower part where the contrast is darkest (the color is deep) is a substrate 4, and the part thereabove where the contrast is relatively bright is a stacked portion 2. In the backscattered electron image, compositional differences are expressed by differences in contrast. In FIG. 5, in a portion of the stacked portion 2 near the interface with the substrate 4, the nearer to the substrate 4, the darker the contrast, that is, the closer to the composition of the substrate 4, and the further away from the substrate 4, the brighter the contrast gradually becomes. This shows that in the shaped article of sample No. 2-1, as shown in FIG. 5, a compositionally graded layer 23 in which compositions of layers become closer to the composition of the substrate 4 toward the substrate 4 is formed at a portion of the stacked portion 2 near the interface with the substrate 4.

REFERENCE SIGNS LIST 1 shaped article
2 stacked portion
21 layer
23 compositionally graded layer
4 substrate

The invention claimed is:

1. A shaped article comprising:
a stacked portion in which a plurality of layers comprised of a first high-speed steel as defined in JIS or AISI are stacked on top of each other; and
a substrate consisting of a second high-speed steel as defined in JIS or AISI having a different composition from the first high-speed steel of the stacked portion,
wherein the stacked portion is formed directly on the substrate, and
at least one of the layers of the stacked portion is a compositionally graded layer in which the composition of the layer becomes more similar to the composition of the substrate toward the substrate.

2. The shaped article according to claim 1, wherein the stacked portion has a porosity of 25% or less and a structure in which a carbide is precipitated in a dispersed manner.

3. The shaped article according to claim 1, wherein the stacked portion has a martensitic structure with an area fraction of 99% or more.

4. The shaped article according to claim 1, wherein a thickness of the substrate is greater than a thickness of each of the layers of the stacked portion.

5. The shaped article according to claim 1, wherein a thickness of each of the layers of the stacked portion is 10 μm or more and 100 μm or less.

6. The shaped article according to claim 1, wherein the layers of the stacked portion are formed by powder of the first high-speed steel melting and solidifying.

7. The shaped article according to claim 1, wherein
a content of carbon in the stacked portion is 0.6 mass % or more,
the stacked portion has a porosity of 25% or less,
the stacked portion has a structure in which carbides are precipitated in a dispersed manner, and
the maximum length of carbides in the structure is 5 μm or less.

* * * * *